United States Patent
Loh et al.

(10) Patent No.: US 10,685,392 B1
(45) Date of Patent: Jun. 16, 2020

(54) SYSTEM AND METHOD FOR VISUALIZATION OF SUBSCRIPTION ITEMS IN AN ITEM UNIVERSE

(71) Applicant: Amazon Technologies, Inc., Seattle, WA (US)

(72) Inventors: Shwu Fang Loh, Seattle, WA (US); Hongzhou Chen, Seattle, WA (US); Vinodth Mohanam, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/277,495

(22) Filed: Sep. 27, 2016

(51) Int. Cl.
*G06Q 30/06* (2012.01)

(52) U.S. Cl.
CPC ..... *G06Q 30/0641* (2013.01); *G06Q 30/0623* (2013.01)

(58) Field of Classification Search
CPC .................................................. G06Q 30/0641
See application file for complete search history.

(56) References Cited

U.S. PATENT DOCUMENTS

| | | | | |
|---|---|---|---|---|
| 7,251,617 B1 * | 7/2007 | Walker | ................. | G06Q 20/085 705/14.27 |
| 10,079,872 B1 * | 9/2018 | Thomas | ................. | H04L 67/09 |
| 2008/0015951 A1 * | 1/2008 | Kerker | ................. | G06Q 10/0875 705/7.29 |
| 2009/0043632 A1 * | 2/2009 | Ricketts | ........... | G06Q 10/06314 705/7.21 |
| 2009/0119231 A1 * | 5/2009 | Gale | ....................... | G06Q 30/02 705/400 |
| 2011/0264703 A1 * | 10/2011 | Lydick | .............. | G06F 17/30914 707/797 |
| 2016/0021089 A1 * | 1/2016 | Adams | .................. | H04L 63/083 726/9 |

OTHER PUBLICATIONS

Samantha Sharf, "12 free apps to track your spending and how to pick the best one for you" Mar. 2, 2016, Forbes (Year: 2016).*

* cited by examiner

*Primary Examiner* — Brittney N Miller
*Assistant Examiner* — Jason B Warren
(74) *Attorney, Agent, or Firm* — Thomas Horstemeyer, LLP

(57) ABSTRACT

Items within an item universe or item repository can be associated with subscription options. A subscription visualization user interface can allow a user to visualize subscription costs over a particular time window and within certain display time periods so that better cost transparency can be achieved. Cost transparency and cost containment can be extremely important in an era of increasing subscription sales.

16 Claims, 8 Drawing Sheets

FIG. 1

| | Jan '16 | Feb '16 | Mar '16 | Apr '16 | May '16 | Estimated Annual Cost |
|---|---|---|---|---|---|---|
| Photo Suite Editor — 102 | | | | | | |
| Monthly ($10/mo for 1yr) ▽ 1 ▷ | $10.00 — 104 | $10.00 | $10.00 | $10.00 | $10.00 | $120.00 [Add to Session] — 121 |
| File Synchronizer — 108 | | | | | | |
| Annual License ($500/license) ▽ 1 ▷ | $500.00 — 110 | | | | | $500.00 [Add to Session] |
| Protein Shake Mix — 112 | | | | | | |
| Monthly ($10/mo for 1yr) ▽ 1 ▷ | $10.00 | $10.00 | $10.00 | $10.00 | $10.00 | $120.00 [Add to Session] |
| | $520.00 | $20.00 | $20.00 | $20.00 | $20.00 | $740.00 — 120 [Add All to Session] — 122 |

— 100

| | Jan '16 | Feb '16 | Mar '16 | Apr '16 | May '16 | Estimated Annual Cost |
|---|---|---|---|---|---|---|
| Photo Suite Editor <br> Annual License ($100/license) ▽  1 ▽ — 527 <br> 525 | $100.00 | | | | | $100.00 — 505 <br> ($20 savings) — 517 <br> (Add to Session) |
| File Synchronizer <br> Annual License ($500/license) ▽  1 ▽ | $500.00 | | | | | $500.00 — 507 <br> (Add to Session) |
| Protein Shake Mix <br> Monthly ($10/mo for 1yr) ▽  1 ▽ | $10.00 | $10.00 | $10.00 | $10.00 | $10.00 | $120.00 — 509 <br> (Add to Session) |
| | $610.00 — 511 | $10.00 | $10.00 | $10.00 | $10.00 | $720.00 — 515 <br> ($20 savings) <br> (Add All to Session) |

FIG. 5

SYSTEM AND METHOD FOR VISUALIZATION OF SUBSCRIPTION ITEMS IN AN ITEM UNIVERSE

BACKGROUND

Items within an item universe or item repository can be associated with subscription options. Subscription sales are becoming more and more ubiquitous as a way to provide software, products, or other services. In this environment, users might have difficulty in assessing their cost commitments to subscription services as the number of these services continues to grow. Small and medium-sized businesses are increasingly looking to subscription services to purchase software on an as-needed basis for various users groups within the enterprise. In these situations, cost transparency and cost containment can be extremely important.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 1 is an example user interface according to embodiments of the disclosure.

FIGS. 3-5 illustrate example user interfaces according to embodiments of the disclosure.

DETAILED DESCRIPTION

Figure 2:
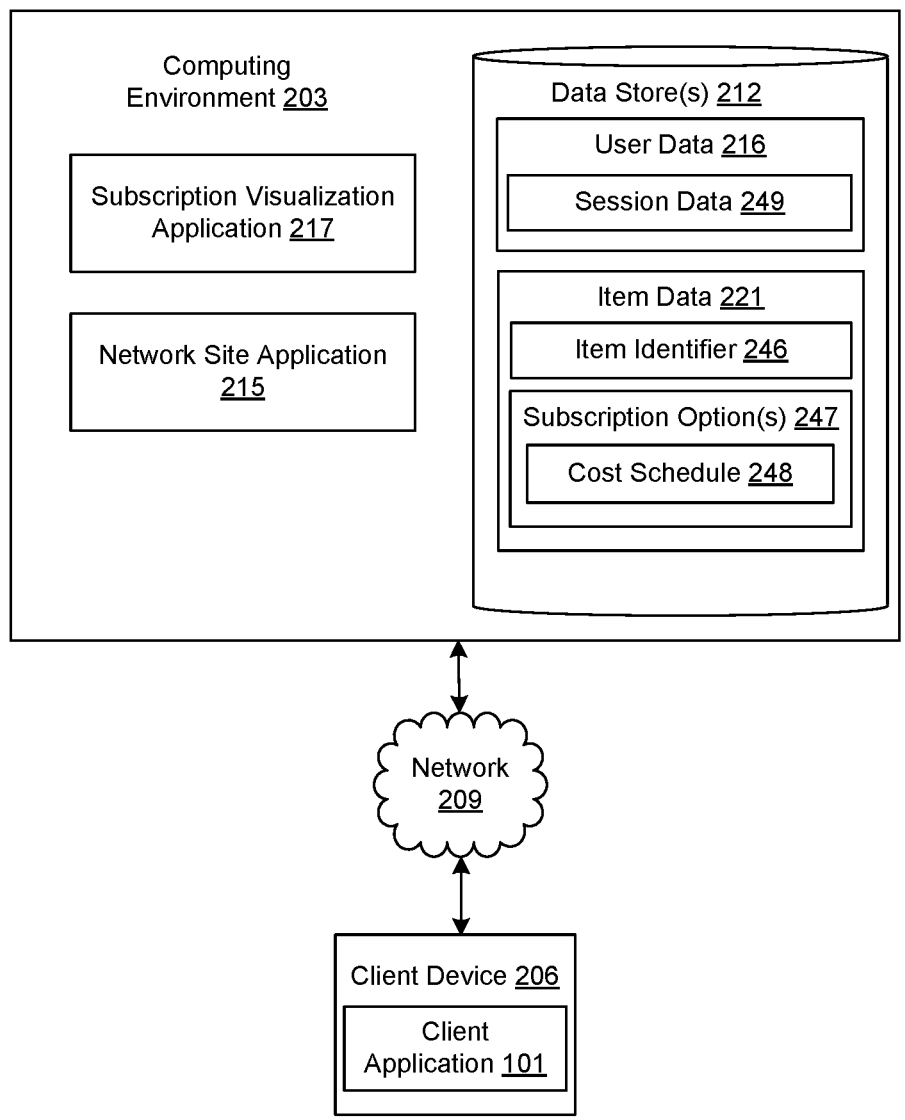
FIG. 2 is a block diagram of a networked environment according to various embodiments of the present disclosure.

The present application is directed to creating a user experience in which subscription options for various items within an item universe can be visualized. In one example, a subscription visualization user interface can be created based upon data within a session. The UI can illustrate the various subscription options that are linked with a particular session and allow a user to visualize and/or export the data associated with the session. This can allow a user to obtain more transparency with respect to up-front and deferred costs with respect to subscription items that are associated with the session. In the context of this disclosure, an item universe can include a product catalog, a collection of items accessible by a search engine, or any other item repository. Items within the item universe can be associated with one or more options under which transactions associated with the items can be conducted. For example, an item can be associated with various subscription options that define terms under which a subscription of temporary license associated with the item can be provided.

For example, a particular software platform or service can be provided on a subscription basis whereby a user or entity can license or lease use of the software or service for a particular period of time. The item can be acquired on a subscription basis in exchange for one or more payment according to a cost schedule defined for the subscription. For example, a user can acquire a subscription for a particular item, such as a video streaming service, in exchange for a monthly or annual fee. As another example, a user can sign up for a regular shipment of a particular item in exchange for subscription payments. The user might also purchase a subscription or temporary license for a software application in exchange for monthly or annual payments.

As the user acquires more and more items from the item universe on a subscription basis, assessing the user's liability for the various subscriptions can become difficult for the user. Without tools to visualize the various subscriptions that a user is acquiring or associating with a session, user abandonment rates can increase, as users might increasingly abandon virtual carts or simply exit a network site. Therefore, embodiments of the disclosure can reduce user-abandonment rates and increase user-engagement rates by providing a subscription visualization user interface that allows the user to visualize the various subscriptions that are associated with a session or a user account.

Turning now to FIG. 1, shown is an example user interface according to embodiments of the disclosure. In the example scenario, an example of a subscription visualization user interface 100 is depicted. In the subscription visualization user interface 100, various selected subscription options associated with items from an item universe are depicted. The subscription options are shown with cost calculations that are based on a selected quantity and a selected subscription option. A particular item can be associated with more than one subscription option, each of which is associated with a particular cost schedule and respective cost calculations associated with the cost schedule. For example, item 102 in the subscription visualization user interface 100 is associated with a session of a user account. In some cases, the session is a virtual shopping cart or a temporary session that is only associated with the particular instance of the subscription visualization user interface 100. The item 102 is associated with a selected subscription option, which is a monthly subscription for a particular software product or service.

Accordingly, an application can identify the selected subscription option, a quantity of the item, and a cost schedule associated with the selected subscription option for the quantity selected. In some cases, a term, or a beginning date and an end date, of the subscription can also be identified based upon the selected subscription option. The application can then populate the subscription visualization user interface 100 with cost calculations associated with at least a portion of the time periods associated with the cost schedule. In the example of FIG. 1, the monthly cost 104 can be displayed in a grid user interface element that depicts a particular calendar time period, such as a one year or twelve month time period along with selected time periods with the calendar time periods.

Additionally, the application can determine whether other items associated with a subscription option are also associated with a user session. If there are, the application can perform cost calculations according to the respective selected subscription options and the respective cost schedules in order to populate the subscription visualization user interface 100 with cost calculations in the appropriate locations of the grid user interface element. For example, in FIG. 1, item 108 is associated with a selected subscription option of an annual license and a cost schedule that specifies an upfront payment on an annual basis for the annual time period covering the license. Accordingly, annual cost 110 can be populated within the grid user interface element in the appropriate display time period. The display time periods represent columns in a grid user interface.

Continuing this example, item 112 is another item that is associated with a monthly subscription option. Item 112, in this example, is not a subscription to a software application or online service. Instead, the item 112 is associated with a monthly shipment of an item to a location specified by the user and/or a user profile. However, because the item 112 is also associated with a cost obligation and a temporary benefit, such as access to a product or service, the item 112 can also be associated with a cost schedule that specifies when payments are to be made. These costs can also be displayed within the grid user interface element in the appropriate display time period. In a subscription visualization user interface 100 certain items may only be associated with a single payment during the time-window shown, and other items might be associated with more than one payment.

Additionally, each of the depicted items in the subscription visualization user interface that have not already been subscribed to by the user can be added to a user session, such as a virtual shopping cart, through the user interface. In one example, an "add-to-session" user interface element can be provided that adds a particular subscription option to a user session. In one examples, a user interface element 121 can allow a user to add a particular item shown in the user interface to a user session. In some examples, a user interface element 122 can allow a user to add all of the items depicted in a subscription visualization user interface 100 to a user session. The subscription visualization user interface 100 can display items that are already purchased or subscribed to by a user or items that are under consideration.

The subscription visualization user interface 100 can be generated by an application or logic that identifies items associated with selected subscription options in a user session, extracts information pertaining to the items from an item repository and assembles a page that can be rendered by a browser or special purpose application on a user's device. Other variations of how a subscription visualization user interface 100 can be generated and populated with data are discussed below.

With reference to FIG. 2, shown is a networked environment 200 according to various embodiments. The networked environment 200 includes a computing environment 203 and one or more client devices 206 in data communication via a network 209. The network 209 includes, for example, the Internet, intranets, extranets, wide area networks (WANs), local area networks (LANs), wired networks, wireless networks, or other suitable networks, etc., cable networks, satellite networks, or any combination of two or more such networks.

The computing environment 203 can comprise, for example, a server computer or any other system providing computing capability. Alternatively, the computing environment 203 can employ a plurality of computing devices that can be arranged, for example, in one or more server banks, computer banks, or other arrangements. Such computing devices can be located in a single installation or may be distributed among many different geographical locations. For example, the computing environment 203 can include a plurality of computing devices that together can comprise a hosted computing resource, a grid computing resource, and/or any other distributed computing arrangement. In some cases, the computing environment 203 can correspond to an elastic computing resource where the allotted capacity of processing, network, storage, or other computing-related resources may vary over time.

Various applications and/or other functionality can be executed in the computing environment 203. Also, various data is stored in a data store 212 that is accessible to the computing environment 203. The data store 212 can be representative of a plurality of data stores 212. The data stored in the data store 212, for example, is associated with the operation of the various applications and/or functional entities described below.

The components executed on the computing environment 203, for example, include a network site application 215, a subscription visualization application 217, and other applications, services, processes, systems, engines, or functionality not discussed in detail herein. The network site application 215 is executed to serve requests from client devices 206 for content. The network site application 215 can retrieve or generate content pages that can transmitted to a client device 206 over the network 209. In one embodiment, the network site application 215 can generate content pages for an electronic marketplace, a search engine, or any other type of site in which content is generated based upon information about items in an item universe. The network site application 215 can also generate a content page that includes a subscription visualization user interface 100 according to various examples of the disclosure.

The subscription visualization application 217 is executed to generate a subscription visualization user interface 100 and populate the subscription visualization user interface 100 with data about items associated with a user session on behalf of the network site application 215. In one example, the subscription visualization application 217 can be invoked by the network site application 215 in response to a user following a link on a content page that causes the subscription visualization user interface 100 to be generated. In another example, the functionality of the subscription visualization application 217 can be incorporated into the network site application 215. The functionality of the subscription visualization application 217 is discussed in more detail below.

The data stored in the data store 212 includes, for example, user data 216, item data 221, and other data that is not depicted that facilitates functioning of the network site application 215 and/or subscription visualization application 217. Item data 221 includes information about items in an item universe, such as a product catalog. A product in a product catalog can take the form of a physical good that can be shipped to a customer, a virtual good that can be electronically transmitted to a client device 206 of a user, or a service that can be performed for the user by a service provider.

For example, item metadata can include other data associated with an item, such as text, images, video, pricing information, or other data fields that might be necessary or helpful to display information about an item in a user interface, ship or sell an item to a buyer, or process transactions for the item within the subscription visualization application 217. For example, item metadata can identify other items within an item universe that a particular item can be paired with so that an item bundle can be formed within a session or shopping cart of a user.

Item data 221 can include an item identifier 231 that uniquely identifies a particular item within the item universe. The item data 221 for a particular item can also specify one or more subscription option 247 associated with the item. Certain items within the item universe may not be associated with any subscription options 247 if they are not available on a subscription basis. The subscription option 247 can include data that specifies the various subscription options 247 for a particular item in the item universe. For example, the subscription option 247 can specify whether the item is available on a monthly basis, a weekly basis, a quarterly basis, an annual basis, etc. Each subscription option 247 can also be associated with a cost schedule 248. The cost schedule 248 can specify a payment schedule associated with a particular subscription option 247. The subscription visualization application 217 can extract data from a particular cost schedule 248 to populate a subscription visualization user interface 100 with display amounts. The cost schedule 248 can also specify a term of a particular subscription option 247.

User data 216 includes information about users of a site facilitated by the computing environment 203. User data 216 can include shipping addresses of the user, user credentials or authentication information, payment information, order history, demographic information, or other user data that may be necessary or helpful to operate a network site. Session data 249 includes data about user sessions as users browse a site and interact with content provided by the network site application 215. Session data 249 can track user activity and user behavior within a site as well as store information such as a virtual shopping cart of a user.

The client device 206 is representative of a plurality of client devices 206 that can be coupled to the network 209. The client device 206 can include, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client device 206 may include a display. The display may include, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 206 can also execute a client application that can render a subscription visualization user interface 100 on the display. For example, the client application can be executed in a client device 206, for example, to access network content served up by the computing environment 203, thereby rendering a subscription visualization user interface 100 in which information about items and bundles of two or more items can be embedded. To this end, the client application can include, for example, a browser or a special-purpose application, and the subscription visualization user interface 100 can include a network page, an application screen, etc.

Next, additional discussion follows for how a subscription visualization user interface 100 can be generated by the subscription visualization application 217 and network site application 215. The network site application 215 can generate user interfaces 100 that display information about items within an item universe. The network site application 215 can also generate user interfaces 100 that display information about subscription options 247 that are available for items within the item universe. The network site application 215 can also provide functionality that allows users to associate items with one or more subscription options 247 and also associate selected items and selected subscription options 247 with a user session. For example, the network site application 215 can generate user interfaces that allow a user to add an item to a virtual shopping cart.

When rendering a user interface, such as an item detail page, that includes information about a particular item, the network site application 215 can determine whether the item metadata for the item identifies one or more subscription options 247 with which a particular item is linked. If so, then the network site application 215 can provide information about the subscription options 247, such as display text defined within the subscription option 247 in the data store 212 within the item detail page. In one example, the display text associated with the subscription options 247 can be provided in a drop-down user interface element in the item detail page. A user can select one of the subscription options 247 and a quantity of the item and associate the item with a session. Then the user can initiate creation of a subscription visualization user interface 100, which can display cost information associated with subscription options of a selected quantity of the various subscription items in the session.

The subscription visualization application 217 can generate the subscription visualization user interface 100 by analyzing the session and identifying those items that are associated with a selected subscription option 247. The subscription visualization user interface 100 can then identify a number of display time periods within the subscription visualization user interface 100 based upon a number of time periods or payments within a respective cost schedule 248 associated with the various subscription options 247. In one example, the subscription visualization user interface 100 can include a grid user interface element that displays as many time periods as the cost schedule 248 having the greatest number of payments defined by its cost schedule 248 within a particular calendar period. In another example, the subscription visualization user interface 100 can include a granularity setting that allows a user to select a number of display time periods within the subscription visualization user interface 100 over a particular calendar period.

The subscription visualization application 217 can also calculate a savings amount for each item displayed within a subscription visualization user interface 100 based upon a selected subscription option 247. The savings amount can be calculated by determining whether a total cost associated with a selected subscription option 247 is less than a highest cost associated with the item within the item universe.

Figure 3:
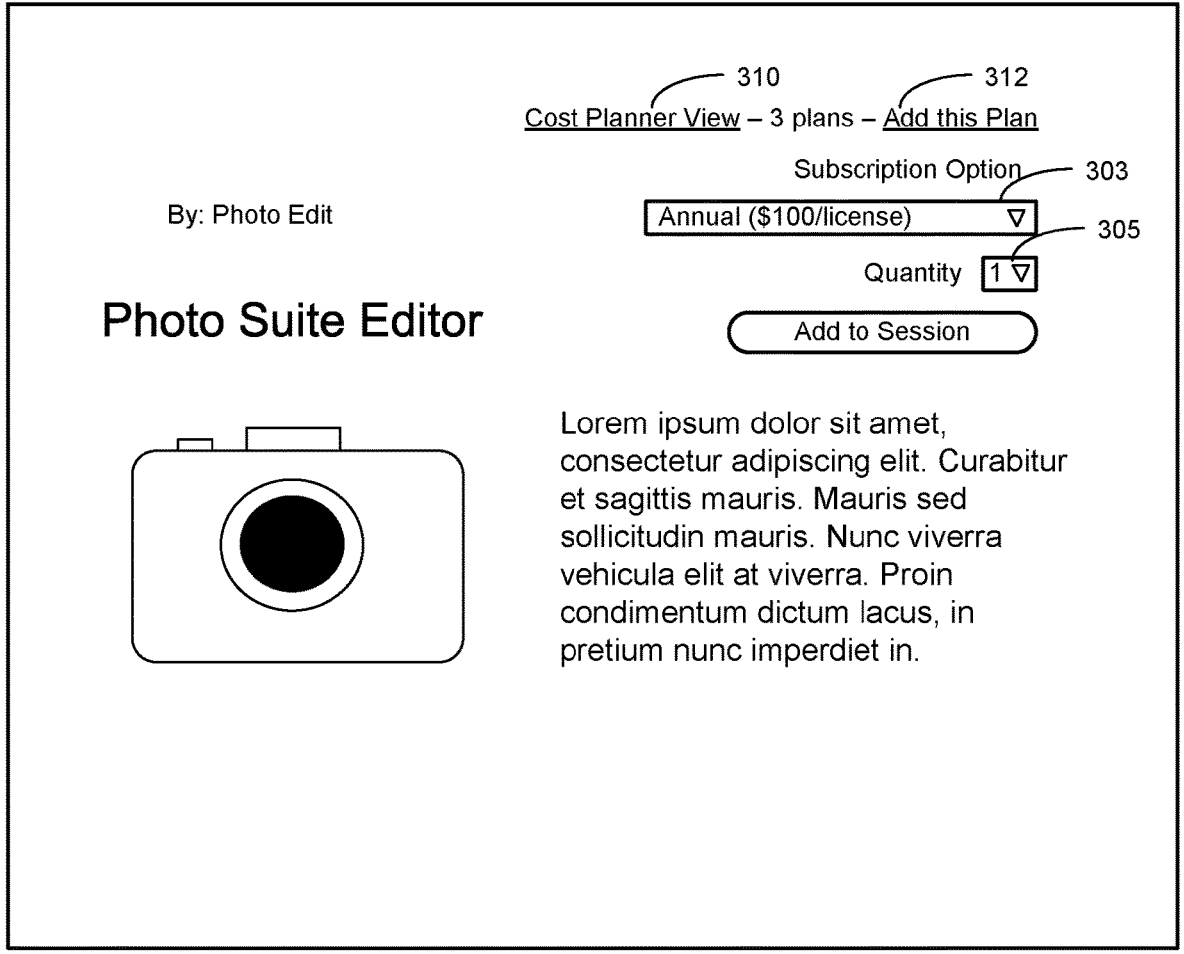

To further illustrate how the subscription visualization application 217 can facilitate creation of the subscription visualization user interface 100, reference is now made to FIG. 3. FIG. 3 illustrates an item detail page 300 that can be generated by the network site application 215 according to examples of the disclosure. In one example, the item detail page 300 can be generated by the network site application 215 in response to a search query initiated by a user, the user selecting a particular item from a list of search results, a automatically search signal, or any other input signal. To generate the item detail page 300, the network site application 215 can determine whether the item corresponding to the page is associated with one or more subscription options 247 in the data store 212. If so, the network site application 215 can generate a subscription option selector 303 that allows the user to select from among the subscription options 247. The user can also select a quantity of subscriptions using the quantity selector 305. Upon selecting a subscription option 247 and quantity of an item, the user can associate the selection with a session, such as a virtual cart.

Additionally, in response to determining that the item in the item detail page 300 is associated with one or more subscription options 247, the network site application 215 can include a hyperlink 310 to generate a subscription visualization user interface 100. Accordingly, following the hyperlink 310 can cause the network site application 215 to invoke the subscription visualization application 217, which can generate and/or populate the subscription visualization user interface 100. Hyperlink 312 can add the depicted item from the item detail page 300 to the subscription visualization user interface 100. In some examples, items can be added to a session that is different from a user session such as a shopping cart. In other words, a separate session can be created for the subscription visualization user interface 100.

Figure 4:
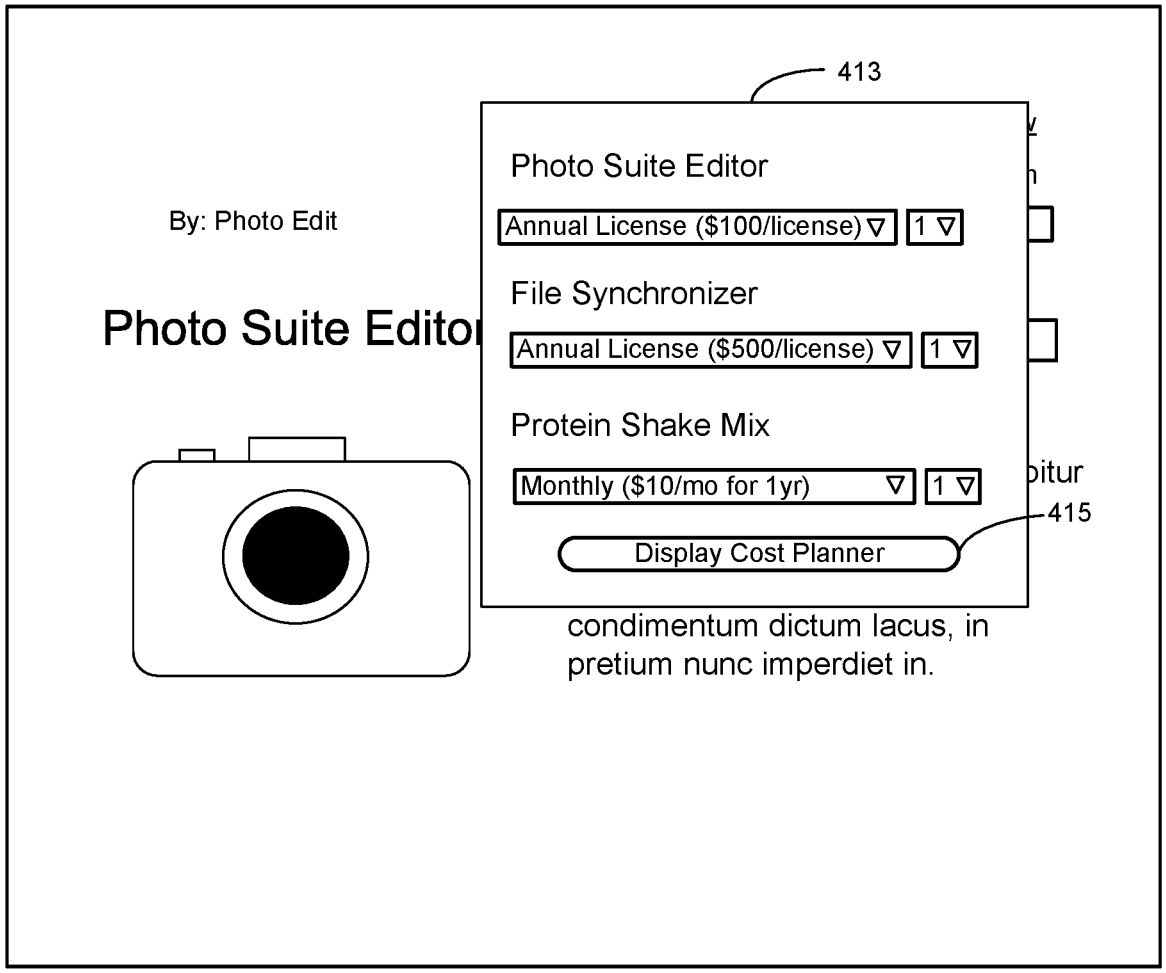

Continuing the example of FIG. 4, reference is now made to FIG. 5. FIG. 5 illustrates an example subscription visualization user interface 100 according to embodiments of the disclosure. In the example of FIG. 5, the subscription visualization user interface 100 is populated by the subscription visualization application 217 and includes display amounts corresponding to the quantity of subscriptions selected for the items and the respective subscription option 247 selected by the user for each of the items. In one example, the subscription visualization user interface 100 can be defaulted to illustrate a month-by-month view of a one-year time period from a current time. In other examples, the subscription visualization user interface 100 can include a granularity setting that allows a user to select a different time-window to display and a different level of granularity within the time-window. For example, the subscription visualization user interface 100 can allow a user to select a week-by-week view of a quarterly time-window.

In one example, the number of display time periods can be selected by determining which of the items within the subscription visualization user interface 100 is associated with a subscription option 247 having a cost schedule 248 with the greatest number of costs within a selected calendar time period. So, for example, if one of the items is associated with a month-by-month subscription option 247 and the time-window shown in the subscription visualization user interface 100 is a one-year time period, the grid within the subscription visualization user interface 100 the display time periods can correspond to a month time period within a grid. If all of the subscription options 247 that are selected are annual subscription with a single payment, the subscription visualization user interface 100 can be generated with the display time periods being a year and the time-window being a multi-year period. The subscription visualization user interface 100 can also be generated with a scrolling element that allows the user to scroll within the display time periods of the time-window.

The subscription visualization application 217 can also calculate a total cost for the time-window displayed within the subscription visualization user interface 100. The total cost can be calculated for each of the items over the displayed time-window as denoted by reference numerals 505, 507, and 509. Additionally, the cost for each display time period can be calculated and display as denoted by reference numeral 511, as one example. An aggregate total cost 515 can also be calculated for all of the depicted items over the depicted time-window. In this way, a user can gain more transparency with respect to expected costs over a time-window that are associated with the various subscription options 247 that are in the user's session.

The subscription visualization application 217 can also calculate and display a savings amount 517 that can be displayed along with one of the displayed amounts in the subscription visualization user interface 100. The savings amount 517 can be calculated by determining whether a higher cost subscription option 247 is available for a particular item and would result in a higher total cost over the displayed time-window. A total savings amount can also be shown in the totaled field within the grid. A scrolling element 521 can allow the user to scroll within the depicted time-window to view additional display time periods. Additionally, the user can modify the selected subscription option 247 and/or the selected quantity associated with an item by utilizing the selection elements 525 and 527. It should be appreciated that differing layouts can be selected for the subscription visualization user interface 100, as can differing types of user interface elements to facilitate selection, manipulation and visualization of items along with subscription options 247 according to the present disclosure.

Figure 6:
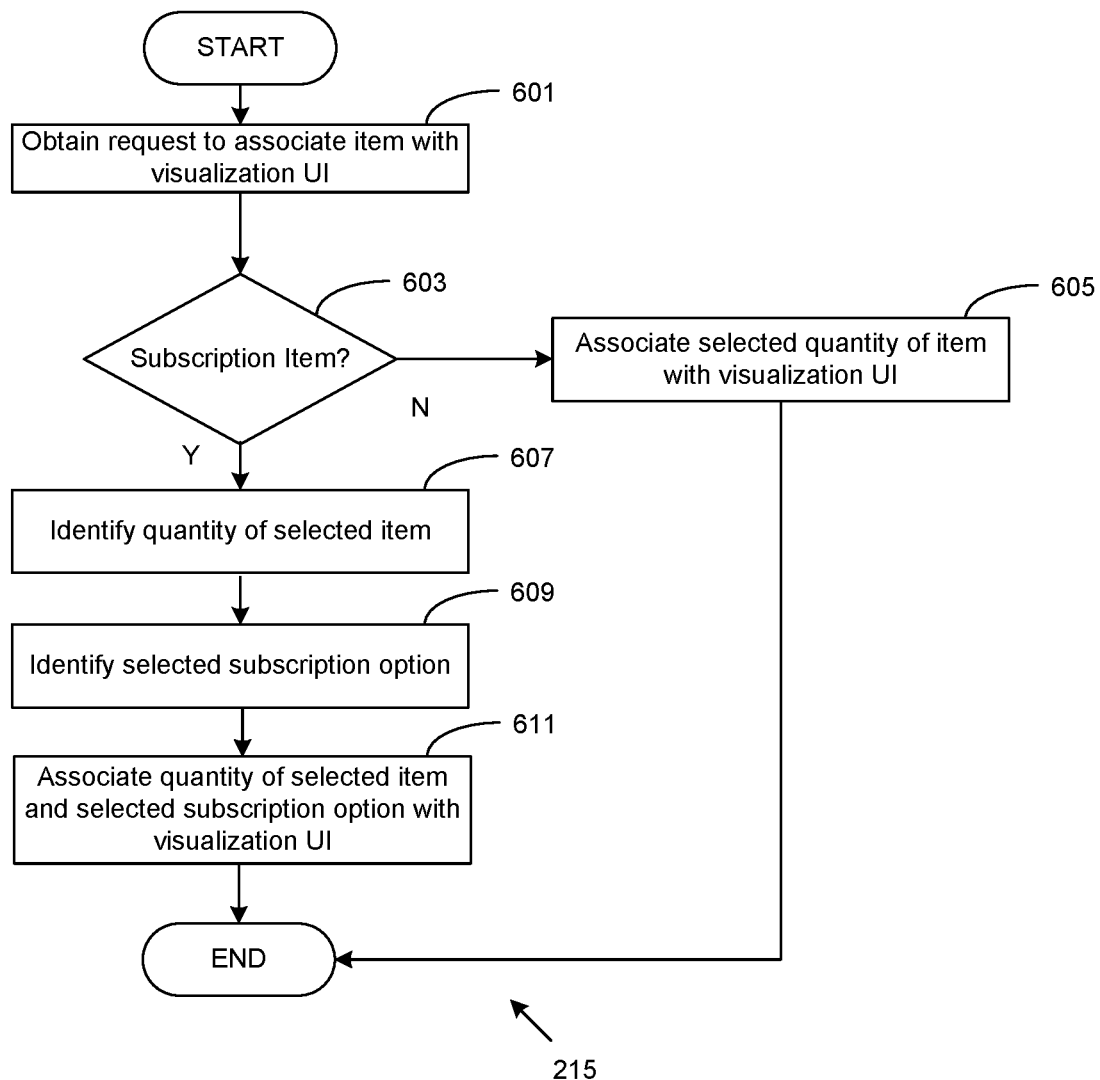
FIGS. 6-7 are flowcharts illustrating examples of functionality implemented as portions of a computing environment in the networked environment of FIG. 2 according to various embodiments of the present disclosure.

Referring next to FIG. 6, shown is a flowchart that provides one example of the operation of a portion of the network site application 215 according to various embodiments. It is understood that the flowchart of FIG. 6 provides merely an example of the many different types of functional arrangements that may be employed to implement the operation of the portion of the network site application 215 as described herein. As an alternative, the flowchart of FIG. 5 can be viewed as depicting an example of elements of a method implemented in the computing environment 203 according to one or more embodiments. FIG. 6 illustrates an example of how the network site application 215 can associate items from an item universe that are associated with subscription options with a user session.

Beginning with box 601, the network site application 215 can obtain a request to associate an item from the item universe with a subscription visualization user interface 100. In one example, the request can be generated in an item detail page associated with a particular item that is associated with one or more subscription options 247 by following hyperlink 312, for example. In another example, the request can be generated from an item detail page for an item that is not associated with any subscription options 247.

At box 603, the network site application 215 can determine whether the item is associated with one or more subscription options 247 in the data store 212. The network site application 215 can make this determination by analyzing the item data 221 associated with an item and identify whether the item is linked with subscription options 247. If the item is not associated with a subscription option 247, the process can proceed to box 605, where the network site application 215 can associate a selected quantity of the item with session associated with the subscription visualization user interface 100. The network site application 215 can determine the selected quantity from the item detail page.

If the item is associated with one or more subscription options 247, the process can proceed to box 607, where the network site application 215 can identify a selected quantity of the selected item. The selected quantity can be obtained via a quantity selector or input element in the item detail page. At box 609, the network site application 215 can identify a selected subscription option 247. The selected subscription option 247 can also be identified from the item detail page. At box 611, the network site application 215 can associate the selected quantity of the selected item and the corresponding selected subscription options for the selected quantity to a session. Thereafter, the process proceeds to completion.

Figure 7:
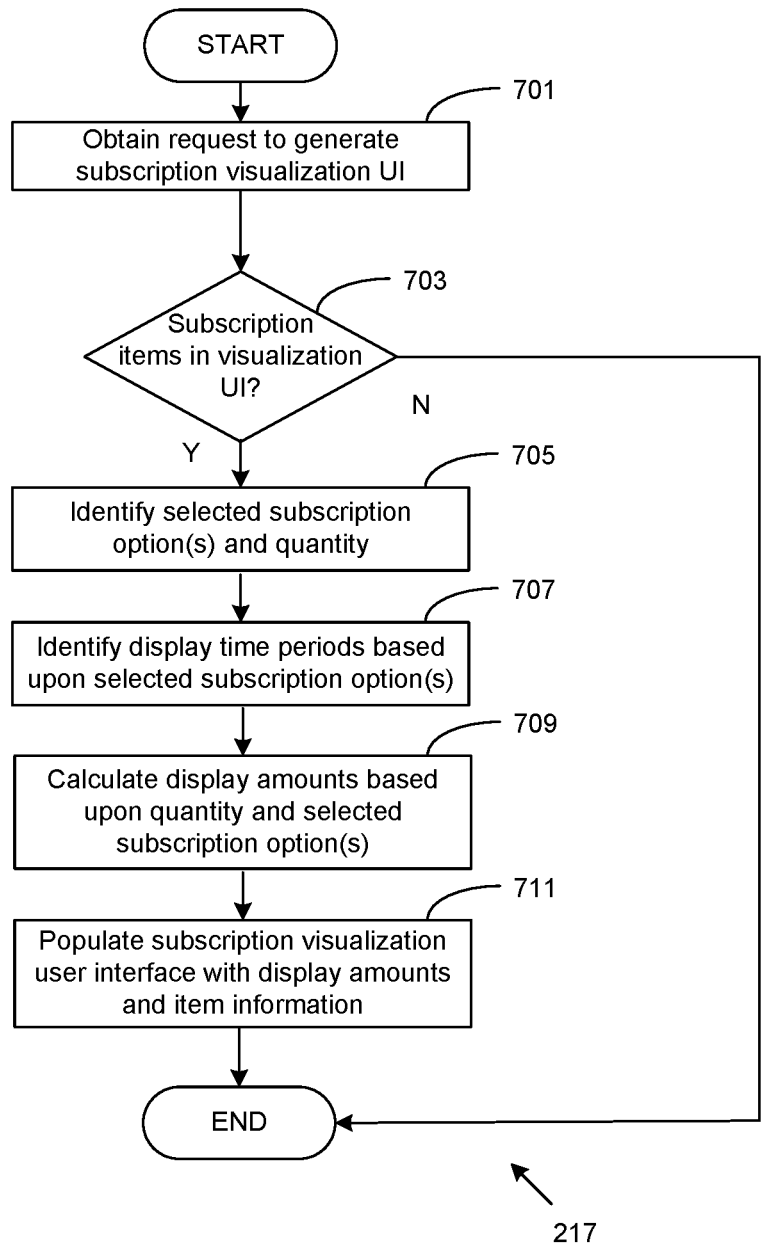

Referring next to FIG. 7, shown is a flowchart that provides one example of the operation of a portion of the subscription visualization application 217 according to various embodiments. It is understood that the flowchart of FIG. 7 provides merely an example of the many different types of functional arrangements that may be employed to implement the operation of the portion of the subscription visualization application 217 as described herein. As an alternative, the flowchart of FIG. 7 can be viewed as depicting an example of elements of a method implemented in the computing environment 203 according to one or more embodiments. FIG. 7 illustrates an example of how the subscription visualization application 217 can generate a subscription visualization user interface 100.

At box 701, the subscription visualization application 217 can obtain a request to generate a subscription visualization user interface 100. The subscription visualization user interface 100 can be associated with a session that is separate from a session associated with a shopping cart of the user. The request can be obtained from the network site application 215 in response to a user following a hyperlink 312 on an item detail page, for example. At box 703, the subscription visualization application 217 can determine whether items associated with subscription options 247 are associated with a particular session. If not, the process can proceed to completion, as there is nothing to populate within the subscription visualization user interface 100.

If there are items associated with subscription options 247 in the session, the process can proceed to box 705, where the subscription visualization application 217 can identify selected subscription options 247 and the selected quantities for the items in the session. Next, at box 707, the subscription visualization application 217 can identify the display time periods based upon the selected subscription options 247. In one example, the display time periods can be defaulted by a month-to-month display within a one year time-window from the current time. In another example, a week-to-week display within a month, quarter, or other time-window can be selected if the selected subscription options 247 are associated with a cost schedule 248 that requires payments that are more frequent than monthly.

At box 709, the subscription visualization application 217 can calculate the display amounts with which to populate the subscription visualization user interface 100 based upon the selected quantity and selected subscription options 247 of items in the session. In one example, the subscription visualization application 217 ignore those items in the session that are not associated with subscription options 247. The display amounts can comprise the payments that are payable according to the cost schedule 248 for the selected subscription options as well as total amounts for particular display time periods, for a particular time-window displayed in the subscription visualization user interface 100, and an aggregate total. Thereafter, the process can proceed to completion.

Figure 8:
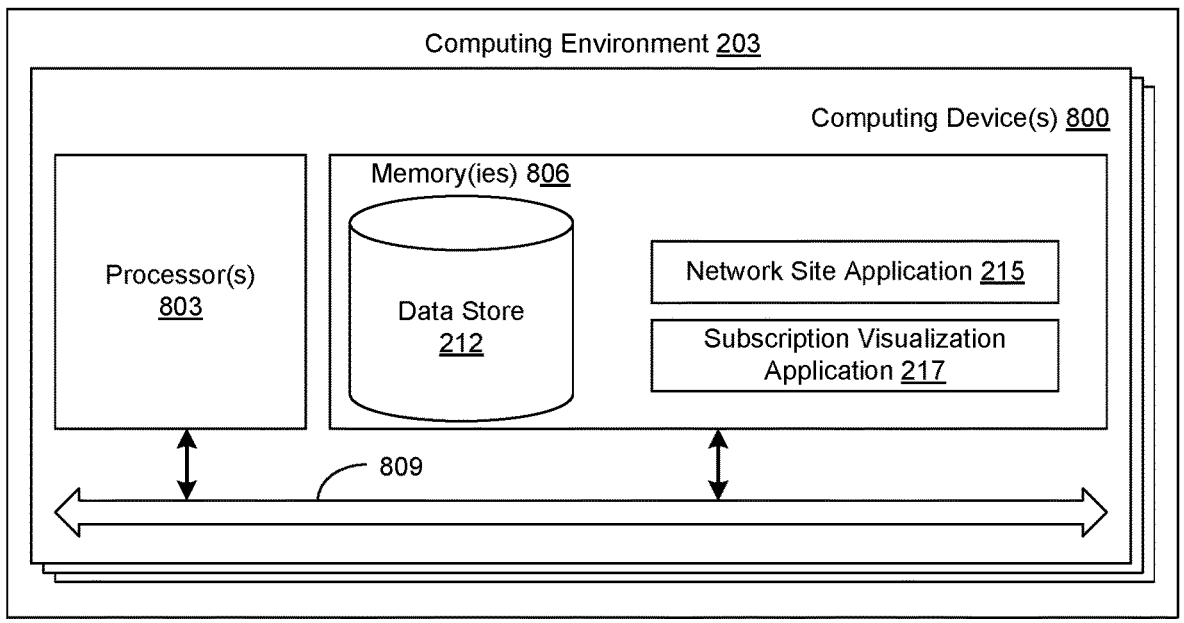
FIG. 8 is a schematic block diagram that provides one example illustration of a computing environment employed in the networked environment of FIG. 2 according to various embodiments of the present disclosure.

With reference to FIG. 8, shown is a schematic block diagram of the computing environment 203 according to an embodiment of the present disclosure. The computing environment 203 includes one or more computing devices 800. Each computing device 800 includes at least one processor circuit, for example, having a processor 803 and a memory 806, both of which are coupled to a local interface 809. To this end, each computing device 800 may comprise, for example, at least one server computer or like device. The local interface 809 may comprise, for example, a data bus with an accompanying address/control bus or other bus structure as can be appreciated.

Stored in the memory 806 are both data and several components that are executable by the processor 803. In particular, stored in the memory 806 and executable by the processor 803 are the network site application 215 the subscription visualization application 217, and potentially other applications. Also stored in the memory 806 may be a data store 212 and other data. In addition, an operating system may be stored in the memory 806 and executable by the processor 803.

It is understood that there may be other applications that are stored in the memory 806 and are executable by the processor 803 as can be appreciated. Where any component discussed herein is implemented in the form of software, any one of a number of programming languages may be employed such as, for example, C, C++, C #, Objective C, Java®, JavaScript®, Perl, PHP, Visual Basic®, Python®, Ruby, Flash®, or other programming languages.

A number of software components are stored in the memory 806 and are executable by the processor 803. In this respect, the term "executable" means a program file that is in a form that can ultimately be run by the processor 803. Examples of executable programs may be, for example, a compiled program that can be translated into machine code in a format that can be loaded into a random access portion of the memory 806 and run by the processor 803, source code that may be expressed in proper format such as object code that is capable of being loaded into a random access portion of the memory 806 and executed by the processor 803, or source code that may be interpreted by another executable program to generate instructions in a random access portion of the memory 806 to be executed by the processor 803, etc. An executable program may be stored in any portion or component of the memory 806 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 806 is defined herein as including both volatile and nonvolatile memory and data storage components. Volatile components are those that do not retain data values upon loss of power. Nonvolatile components are those that retain data upon a loss of power. Thus, the memory 806 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 803 may represent multiple processors 803 and/or multiple processor cores and the memory 806 may represent multiple memories 806 that operate in parallel processing circuits, respectively. In such a case, the local interface 809 may be an appropriate network that facilitates communication between any two of the multiple processors 803, between any processor 803 and any of the memories 806, or between any two of the memories 806, etc. The local interface 809 may comprise additional systems designed to coordinate this communication, including, for example, performing load balancing. The processor 803 may be of electrical or of some other available construction.

Although the network site application 215, the subscription visualization application 217, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 5-6 shows the functionality and operation of an implementation of portions of the network site application 215 and the subscription visualization application 217. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 803 in a computer system or other system. The machine code may be converted from the source code, etc. If embodied in hardware, each block may represent a circuit or a number of interconnected circuits to implement the specified logical function(s).

Although the flowcharts of FIGS. 5-6 shows a specific order of execution, it is understood that the order of execution may differ from that which is depicted. For example, the order of execution of two or more blocks may be scrambled relative to the order shown. Also, two or more blocks shown in succession in FIGS. 5-6 may be executed concurrently or with partial concurrence. Further, in some embodiments, one or more of the blocks shown in FIGS. 5-6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the network site application 215 and the subscription visualization application 217, that comprises software or code can be embodied in any non-transitory computer-readable medium for use by or in connection with an instruction execution system such as, for example, a processor 803 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the network site application 215 and the subscription visualization application 217, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 800, or in multiple computing devices 800 in the same computing environment 203. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A system, comprising:
   at least one computing device;
   a data store housing an item repository, the data store in communication with the at least one computing device; and
   an application executable by the at least one computing device, wherein the application causes the at least one computing device to at least:
   generate a subscription visualization user interface associated with a plurality of items associated with a session, the subscription visualization user interface comprising a plurality of display time periods, and a user interface element indicating a cost for a respective subscription option based at least in part on: a first subscription option comprising a cost per time period, or a second subscription option comprising a cost per payment associated with an item of the plurality of items;
   identify a respective quantity of the item;
   determine the plurality of display time periods based upon a respective cost schedule associated with the item, wherein the subscription visualization user interface comprises a plurality of items, and the plurality of display time periods are determined based upon the respective cost schedule of the plurality of items having a greatest frequency of costs in a selected calendar time period, the selected calendar time period comprising a month, a quarter, a year, or a multi-year time window;

calculate a display amount for each of the display time periods for the item based upon the respective quantity and the respective subscription option;

populate the subscription visualization user interface with the display amount for at least one of the display time periods, the user interface element comprising the cost associated with the at least one of the first subscription option and the second subscription option, and item information for the item, wherein the item information is extracted from the item repository;

modify a selected subscription option in response to a selection of the user interface element comprising the cost per payment;

determine, based at least in part on the selected subscription option, a plurality of new display time periods associated with the selected calendar time period; and populate the subscription visualization user interface with the plurality of new display time periods and a display amount calculated for at least one of the new display time periods based upon the selected subscription option.

2. The system of claim 1, wherein the application is further configured to cause the at least one computing device to at least export a cost table associated with the item to a file comprising a plurality of comma separated values.

3. The system of claim 1, wherein the application is further configured to calculate a savings amount for the item for display with the display amount, the savings amount based upon the respective quantity and the respective subscription option relative to a higher cost associated with the item in the item repository.

4. The system of claim 1, wherein the application is further configured to calculate a total cost for each of the plurality of time periods within the subscription visualization user interface.

5. The system of claim 1, wherein the application is further configured to obtain a granularity setting via the subscription visualization user interface, the granularity setting configured to allow for user selection of a quantity of the plurality of time periods.

6. The system of claim 1, wherein the respective cost schedule for one of the plurality of items comprises a single cost during a calendar time period and the respective cost schedule for another one of the plurality of items comprises a plurality of costs during the calendar time period.

7. The system of claim 1, wherein the user interface element is a drop-down user interface element.

8. The system of claim 1, wherein the cost is the cost per time period, wherein the plurality of items comprises the item and at least a second item from the item repository that is associated with the session, and wherein the application is further configured to:

identify a third subscription option associated with the second item;

determine an updated plurality of display time periods associated with the subscription visualization user interface based upon a cost schedule of the first subscription option of the item and a cost schedule of the third subscription option of the second item having the greatest frequency of costs in the selected calendar time period;

calculate an updated display amount for each of the updated display time periods for the item based at least upon the first subscription option of the item and the third subscription option of the second item; and populate the subscription visualization user interface with the updated display amount for at least one of the updated display time periods and a second user interface element comprising a second cost associated with the third subscription option, the second cost being a cost per payment.

9. A method comprising:

generating, via at least one computing device, a subscription visualization user interface associated with a plurality of items associated with a session, the subscription visualization user interface comprising a plurality of display time periods, and a user interface element indicating a cost for a respective subscription option based at least in part on: a first subscription option comprising a cost per time period, or a second subscription option comprising a cost per payment associated with an item of the plurality of items;

identifying, via the at least one computing device, a respective quantity of the item;

calculating, via the at least one computing device, a display amount for each of a plurality of display time periods within the subscription visualization user interface for the item based upon the respective quantity and the respective subscription option, wherein the display time periods represent columns in a grid, wherein the plurality of time periods are determined based upon a respective cost schedule of the plurality of items having a greatest frequency of costs in a selected calendar time period, the selected calendar time period comprising a month, a quarter, a year, or a multi-year time window; and populating, via the at least one computing device, the subscription visualization user interface with the display amount for each of the display time periods, the user interface element comprising the cost associated with the at least one of the first subscription option and the second subscription option, and item information for the item, wherein the item information is extracted from an item repository;

modifying, via the at least one computing device, a selected subscription option in response to a selection of the user interface element comprising the cost per payment;

determining, via the at least one computing device and based at least in part on the selected subscription option, a plurality of new display time periods associated with the selected calendar time period; and populating, via the at least one computing device, the subscription visualization user interface with the plurality of new display time periods and a display amount calculated for at least one of the new display time periods based upon the selected subscription option.

10. The method of claim 9, further comprising exporting a cost table associated with the item to a file comprising a plurality of comma separated values.

11. The method of claim 9, further comprising calculating a savings amount for the item for display with the display amount, the savings amount based upon the respective quantity and the respective subscription option relative to a higher cost associated with the item in the item repository.

12. The method of claim 9, further comprising calculating a total cost for each of the plurality of time periods within the subscription visualization user interface, wherein the total cost for each of the plurality of time periods is displayed in a column corresponding to the respective ones of the time periods.

13. The method of claim 9, further comprising calculating a total cost for the item, wherein the total cost for the item is displayed at an end of a row associated with the item.

14. The method of claim 13 further comprising:
   calculating a total cost for a different item, wherein the total cost for the different item is displayed at an end of a row associated with the different item.

15. The method of claim 9, further comprising obtaining a granularity setting via the subscription visualization user interface, the granularity setting configured to allow for user selection of a quantity of the plurality of time periods.

16. The method of claim 9, wherein the user interface element is a drop-down user interface element.

* * * * *